(12) United States Patent
De Roeck (10) Patent No.: US 11,273,656 B2
(45) Date of Patent: Mar. 15, 2022

(54) WASHING STATION FOR REMOVING RESIDUES FROM A STICKY FLAT LAYER

(71) Applicant: AGFA NV, Mortsel (BE)

(72) Inventor: Luc De Roeck, Mortsel (BE)

(73) Assignee: AGFA NV, Mortsel (BE)

( * ) Notice: Subject to any disclaimer, the term of this patent is extended or adjusted under 35 U.S.C. 154(b) by 99 days.

(21) Appl. No.: 16/613,870

(22) PCT Filed: May 16, 2018

(86) PCT No.: PCT/EP2018/062681
§ 371 (c)(1),
(2) Date: Nov. 15, 2019

(87) PCT Pub. No.: WO2018/210912
PCT Pub. Date: Nov. 22, 2018

(65) Prior Publication Data
US 2021/0146703 A1   May 20, 2021

(30) Foreign Application Priority Data

May 18, 2017   (EP) ..................................... 17171792

(51) Int. Cl.
*B41J 29/17*   (2006.01)
*B41J 3/407*   (2006.01)
(Continued)

(52) U.S. Cl.
CPC ............. *B41J 29/17* (2013.01); *B41J 3/4078* (2013.01); *B41J 11/007* (2013.01);
(Continued)

(58) Field of Classification Search
CPC ..... C09D 11/107; C09D 11/326; C09D 11/38; C09D 11/322; C09D 11/101; C09D 11/36;
(Continued)

(56) References Cited

U.S. PATENT DOCUMENTS 3,692,402 A * 9/1972 Solarek .............. G03G 21/0035
                                                    399/287
5,276,485 A * 1/1994 Osbourne ............ G03G 15/754
                                                    355/72
(Continued)

FOREIGN PATENT DOCUMENTS

EP    0 215 803 B1    10/1989
EP    1 041 193 A1    10/2000
(Continued)

*Primary Examiner* — Manish S Shah
(74) *Attorney, Agent, or Firm* — Leydig, Voit & Mayer, Ltd.

(57) ABSTRACT

A sticky-layer-cleaner for removing residues adhered to a sticky flat layer includes a receptacle for a cleaning-liquid and a cleaning-roll in contact with the sticky flat layer, wherein the cleaning-roll includes an elongated carpet fabric which is helically folded around the cleaning-roll and a pile of which includes yarn tufts in loop and/or cut configuration, and the cleaning-roll further includes a helical channel along the length of the folded carpet fabric for draining the cleaning-liquid from the cleaning-roll and/or for wetting the cleaning-roll with the cleaning-liquid.

15 Claims, 8 Drawing Sheets

(51) Int. Cl.
*B41J 11/00* (2006.01)
*C09D 11/033* (2014.01)
*C09D 11/102* (2014.01)
*C09D 11/30* (2014.01)
*D06P 5/30* (2006.01)

(52) U.S. Cl.
CPC .......... *C09D 11/033* (2013.01); *C09D 11/102* (2013.01); *C09D 11/30* (2013.01); *D06P 5/30* (2013.01)

(58) Field of Classification Search
CPC ......... C09D 11/40; C09D 11/30; C09D 11/32; C09D 11/324; C09D 11/328; C09D 11/102; C09D 11/005; C09D 11/54; C09D 11/52; C09D 11/106; C08K 2003/2237; C08K 3/11; B41J 11/0021; B41J 2/2107; B41J 2/01; B41J 11/002; B41J 2/0057; B41J 2/04588; B41J 2/04595; B41J 2/04586; B41J 29/02; B41J 2/17513; B41J 2/17509; B41J 29/13; B41J 2/17553; B41J 2/1606; B41J 2/1642; B41J 2/1609; B41J 2/1433; B41J 2/164; B41J 2/162; B41J 2/211; B41J 2/17; B41J 2/17593; B41J 2/1755; B41J 2/2114; B41J 2/2117; B41J 2/2056; B41J 2/21; B41J 3/60; B41J 2002/012; B41J 2/04598; B41J 2/161; B41J 2/19; B41J 15/04; B41M 5/0023; B41M 7/0081; B41M 3/006; B41M 3/003; B41M 5/0011; B41M 7/0072; B41M 5/52; B41M 5/5218; B41M 5/0017; B41M 5/0047; B41M 7/00; B41M 2/04588; B41M 2/04595; B41M 2/04586; B41M 2/14274; B41M 5/5227; G02B 5/20; G02B 5/223
See application file for complete search history.

(56) References Cited

U.S. PATENT DOCUMENTS

| | | | |
|---|---|---|---|
| 6,074,054 A * | 6/2000 | Katsuyama | B41J 3/4078 226/145 |
| 6,679,601 B1 * | 1/2004 | Pham | B41J 11/007 134/6 |
| 2002/0121333 A1 * | 9/2002 | Sofer | B41M 5/0256 156/240 |
| 2003/0103126 A1 * | 6/2003 | Pham | B41J 29/17 347/104 |
| 2006/0192830 A1 * | 8/2006 | Lee | B41J 15/046 347/104 |
| 2009/0098385 A1 | 4/2009 | Kaemper et al. | |
| 2014/0253622 A1 * | 9/2014 | Momose | B41J 11/007 347/16 |

FOREIGN PATENT DOCUMENTS

| | | |
|---|---|---|
| EP | 1 669 635 A1 | 6/2006 |
| EP | 2 868 604 A1 | 5/2015 |
| JP | 11-192694 A | 7/1999 |
| WO | 02/38855 A2 | 5/2002 |
| WO | 2016/016884 A1 | 2/2016 |

* cited by examiner

WASHING STATION FOR REMOVING
RESIDUES FROM A STICKY FLAT LAYER

CROSS REFERENCE TO RELATED
APPLICATIONS

This application is a 371 National Stage Application of PCT/EP2018/062681, filed May 16, 2018. This application claims the benefit of European Application No. 17171792.9, filed May 18, 2017, which is incorporated by reference herein in its entirety.

BACKGROUND OF THE INVENTION

1. Field of the Invention

The invention relates to a sticky-layer-cleaner, which is a kind of washing station, in the field of inkjet-printers wherein a flat substrate is transported and printed on a sticky-conveyor-belt by a belt-conveyor and wherein the sticky-conveyor-belt has to be cleaned to remain sticky.

2. Description of the Related Art

A belt-conveyor is a well-known substrate transport system with a conveyor-belt in digital printers. Such substrate transport system is for example built in the JETI TAURO™ from manufacturer AGFA GRAPHICS™, which is an inkjet-printer and wherein a flat substrate is connected on the conveyor-belt while printing on the flat substrate by a vacuum power.

Another way of holding down a flat substrate towards the conveyor-belt while printing is the use of a conveyor-belt with an adhesive support layer. Such a conveyor-belt is a kind of sticky-conveyor-belt. It is a known substrate transport system in digital printers especially in digital textile printers. A sticky-conveyor-belt is for example built in the Efi™ Reggiani™ fabric printing solution EFI Reggiani PRO 180 or 380.

Using a sticky-conveyor-belt in a belt-conveyor allows an exact positioning of the flat substrate on the sticky-conveyor-belt. The flat substrate, especially flexible woven flat substrate, on such sticky-conveyor-belt are not be stretched and/or deformed while the flat substrate is being printed. The adhesive as top layer of the sticky-conveyor-belt may be activated by an infrared dryer to make the conveyor-belt sticky or the top layer comprises a removable pressure sensitive adhesive.

Another example of a sticky-conveyor-belt in a belt-conveyor is disclosed in WO2002038855 (APRION DIGITAL LTD) wherein a method for printing on a dimensionally unstable flat substrate, such as textile is provided.

In a production environment, while using an inkjet-printer, a sticky-conveyor-belt becomes contaminated with residues such as dust or inkjet-printing-liquid residues whereby the adhesive force, namely the stickiness, of the sticky-conveyor-belt becomes less.

Therefor belt-cleaners are implemented in the state-of-the-art wherein the conveyor-belt is cleaned after the printed flat substrate is removed from the conveyor-belt. For example JP11192694 (CANON KK) discloses a washing station for a conveyor-belt in an inkjet-printer. Such belt-cleaners comprises one or multiple cleaning-rolls whereon hard and long bristles are attached for the cleaning of inkjet-printing-liquid residues.

However, when using a sticky-conveyor-belt in a belt-conveyor, there is need a solution to gentle clean the sticky-conveyor-belt so the sticky flat layer, such as an adhesive-support-layer, is not damaged.

It is a serious health hazard for applying an adhesive to a conveyor-belt due to the vapor that comes free from the adhesive while applying. Normally the adhesive on the sticky-conveyor-belt have to be removed totally by scrapers and then the adhesive has to apply uniformly and with the same thickness on the conveyor-belt. This tremendous job takes several hours.

The path of the sticky-conveyor-belt may also not be changed—thus no web-swim, banding or vibrations—after or while cleaning the sticky-conveyor-belt, which causes misalignments issues in the inkjet printed images. Thus, it results in bad quality inkjet printed images.

SUMMARY OF THE INVENTION

In order to overcome the problems described above, preferred embodiments of the present invention have been realised with a sticky-layer-cleaner (100) as defined below, which in a preferred embodiment is built in an inkjet-printer (900) with a sticky-conveyor-belt comprised in a belt-conveyor as also defined below. The present invention includes also the usage of the sticky-layer-cleaner (100), as defined below, in an inkjet-printer (900).

The present invention is a sticky-layer-cleaner (100) for removing one or more residues adhered to a sticky flat layer (2000); wherein the sticky-layer-cleaner (100) comprises:
  a receptacle (400) for a cleaning-liquid (700); and
  a cleaning-roll (500), which is in contact with the sticky flat layer (2000);
wherein the cleaning-roll (500) comprises an elongated carpet fabric (2500) which is helically folded around the cleaning-roll (500) and in which the pile is composed of yarn tufts in loop and/or cut configuration; and wherein preferably the cleaning-roll (500) comprises a helical channel along the length of the enfolded carpet fabric (2500) for draining the cleaning-liquid (700) from the cleaning-roll (500) and/or for wetting the cleaning-roll (500) by the cleaning-liquid (700). A pile composed of yarn tufts in loop configuration is preferred.

The cleaning-roll (500) is arranged, e.g. hangs, in the receptacle (400) to provide the cleaning-liquid (700) in the receptacle (400) towards the cleaning-roll (500).

In a preferred embodiment the cleaning-roll (500) is in contact with the sticky flat layer (2000) by a friction force.

The cleaning-roll (500) is arranged to be rotatable in the sticky-layer-cleaner (100). The rotation of the cleaning-roll (500) may be caused by the movement of the sticky flat layer (2000), such as the sticky support-layer from a sticky-conveyor-belt in a belt-conveyor and/or the movement of the sticky-layer-cleaner (100) itself in a direction that is parallel to the plane wherein the sticky flat layer (2000) lays down. In a preferred embodiment, the sticky-layer-cleaner (100) comprises a washing-motor (800) wherein the cleaning-roll (500) is driven to rotate around the shaft of the cleaning-roll (500).

The rotation of the cleaning-roll (500) by movement of the cleaning-roll (500) and/or movement of the sticky flat layer (2000) and/or movement of the sticky-layer-cleaner (100) eliminates residues on the sticky flat layer (2000), together with the use of a cleaning-liquid (700), such as water. A flow of the cleaning-liquid (700) passes through the cleaning-roll (500) by the rotation of the cleaning-roll (500) and takes the residues on the sticky flat layer (2000) away.

The elongated carpet fabric (2500), helically folded around the cleaning-roll (500) makes that the sticky flat layer (2000) is gently touched and cleaned so the residues are removed but the stickiness of the sticky flat layer (2000) remains. A longer lifetime of the sticky flat layer (2000) and a longer lifetime of the stickiness of the sticky flat layer (2000) in a production environment is thereby guaranteed.

It is found that the elongated carpet fabric (2500), helically folded around the cleaning-roll (500) that no foam is formed on the sticky flat layer (2000) and in the receptacle (400), enhances the cleaning power. Too much bubbles in the receptacle (400) and on the sticky flat layer (2000) makes the cleaning of the sticky flat layer (2000) inefficient. The added helical channel along the length of the enfolded carpet fabric (2500) prevents also the foam formation in the receptacle (400) for the cleaning-liquid (700) and on the sticky flat layer (2000).

The absorbing characterization of the carpet fabric (2500), helically folded around the cleaning-roll (500) makes it possible to use less cleaning liquid; which makes the present invention more environmental friendly. In addition, the added helical channel along the length of the enfolded carpet fabric (2500) prevents also the use of too much cleaning-liquid (700). The present invention cleans the sticky flat layer (2000) thus with a minimum amount of cleaning-liquid (700). This results that the drying of the sticky flat layer (2000) shall be faster. It is found that no extra or a small drying system is needed for drying the wet sticky flat layer (2000) after cleaning. This makes that the sticky-layer-cleaner (100) can be constructed in a compact way.

The added helical channel along the length of the enfolded carpet fabric (2500) makes it possible to drain fast contaminated cleaning-liquid (700) and thus a fast purging of the residues on the sticky flat layer (2000) and cleaning-roll (500) towards the receptacle (400) for the cleaning-liquid (700).

In a preferred embodiment, the width of the helical channel along the length of the enfolded carpet fabric (2500) is from 0.1 mm to 50 mm, more preferably from 0.5 mm to 10 mm.

The helical channel along the length of the enfolded carpet fabric (2500) is in a preferred embodiment formed by the opposite lateral edges from the length of the carpet fabric (2500) abutted against each other by a distance less than 50 mm, more preferably by a distance less than 10 mm. The distance may be zero mm because the lateral edges of the elongated carpet fabric (2500) may have no pile or a pile with a lower height than in the middle of the elongated carpet fabric (2500). Hereby when the lateral edges are stitched together, a helical channel is formed.

The cleaning power, for example by less foam formation, and/or environment friendliness, may even enhanced more by:
- a pile composed of polytetrafluoroethylene, polypropylene, polyurethane, polyester, aromatic polyamides, rayon, acrylic, cellulose, viscose and/or nylon; and/or
- a height of pile is from 0.4 mm to 20 mm; and/or
- a fabric density of the carpet fabric (2500) from 1000 per $cm^2$ until 100000 filaments per $cm^2$ and/or
- a width of the elongated carpet fabric (2500) between 2 mm and 100 mm; preferably between 10 mm and 50 mm.

It is found that the present invention of the sticky-layer-cleaner (100) and the preferred embodiments gives a longer lifetime of the cleaning-roll (500) than in the state-of-the-art. Therefore, the present invention minimizes the number of replacement of a sticky flat layer (2000) or cleaning-roll (500) per year in a production environment.

In a preferred embodiment, the cleaning power of the present invention is enhanced by an arrangement of the cleaning-roll (500) for performing an axial movement during rotation of the cleaning-roll (500). The axial movement together with the helically folded carpet fabric (2500) makes that the residues on the sticky flat layer (2000) are easily removed. The helical channel on the cleaning-roll (500) from the present invention makes the sticky-layer-cleaner (100) even more powerful in cleaning without damaging the sticky flat layer (2000).

The sticky-layer-cleaner (100) preferably comprises a liquid-sprayer (1100) for supplying the cleaning-liquid (700) towards the cleaning-roll (500) and/or sticky flat layer (2000).

The present invention of the sticky-layer-cleaner (100) or a preferred embodiment of the sticky-layer-cleaner (100) is preferably built in an inkjet-printer (900), which comprises a sticky-conveyor-belt wherein a sticky support-layer on the sticky-conveyor-belt is the sticky flat layer (2000). The sticky support-layer is a layer whereon a flat substrate (1000) may be supported for printing and/or while printing. The sticky-conveyor-belt is comprised in the belt-conveyor for transporting flat substrates (1000) for printing and/or while printing.

In a preferred embodiment, the sticky support-layer is for supporting the one of more of the following flat substrates (1000) for printing and/or while printing:
- brittle print receiver such as glass; cement panels, fiber cement panels, ceramics or coated resin impregnated paper; and/or
- rough back-side print receiver such as natural leather; and/or
- dimensionally unstable print receiver such as textile; and/or
- permeable print receiver such as liquid permeable print receiver, textile, cotton, cloth, flag fabrics.

In a more preferred embodiment, the sticky support-layer is for supporting the one of more of the following flat substrates (1000) for printing and/or while printing:
- glass; cement panels, fibre cement panels, ceramics or coated resin impregnated paper; and/or
- natural leather, hide; and/or
- textile, fabric, carpet; and/or
- cotton, cloth, flag fabrics, knitted polyester fabrics; and/or
- flexible material comprising a network of natural or artificial fibres (yarn or thread); and/or
- styrene board; corrugated cardboard
- plastic foil.

To handle one of such flat substrates (1000), the inkjet-printer (900) is preferably selected from a group, a so-called printer-group, which consists of textile inkjet-printer, plastic foil inkjet-printer and leather inkjet-printer. Thus, the inkjet-printer (900) may be a textile inkjet-printer, a plastic foil inkjet-printer or a leather inkjet-printer.

The present invention comprises also the use of the inkjet-printer (900), as presented above as the present invention, for inkjet printing on textile, plastic foil or leather, especially natural leather.

DETAILED DESCRIPTION OF THE PREFERRED EMBODIMENTS

Conveyor-Belt (250)

Figure 1:
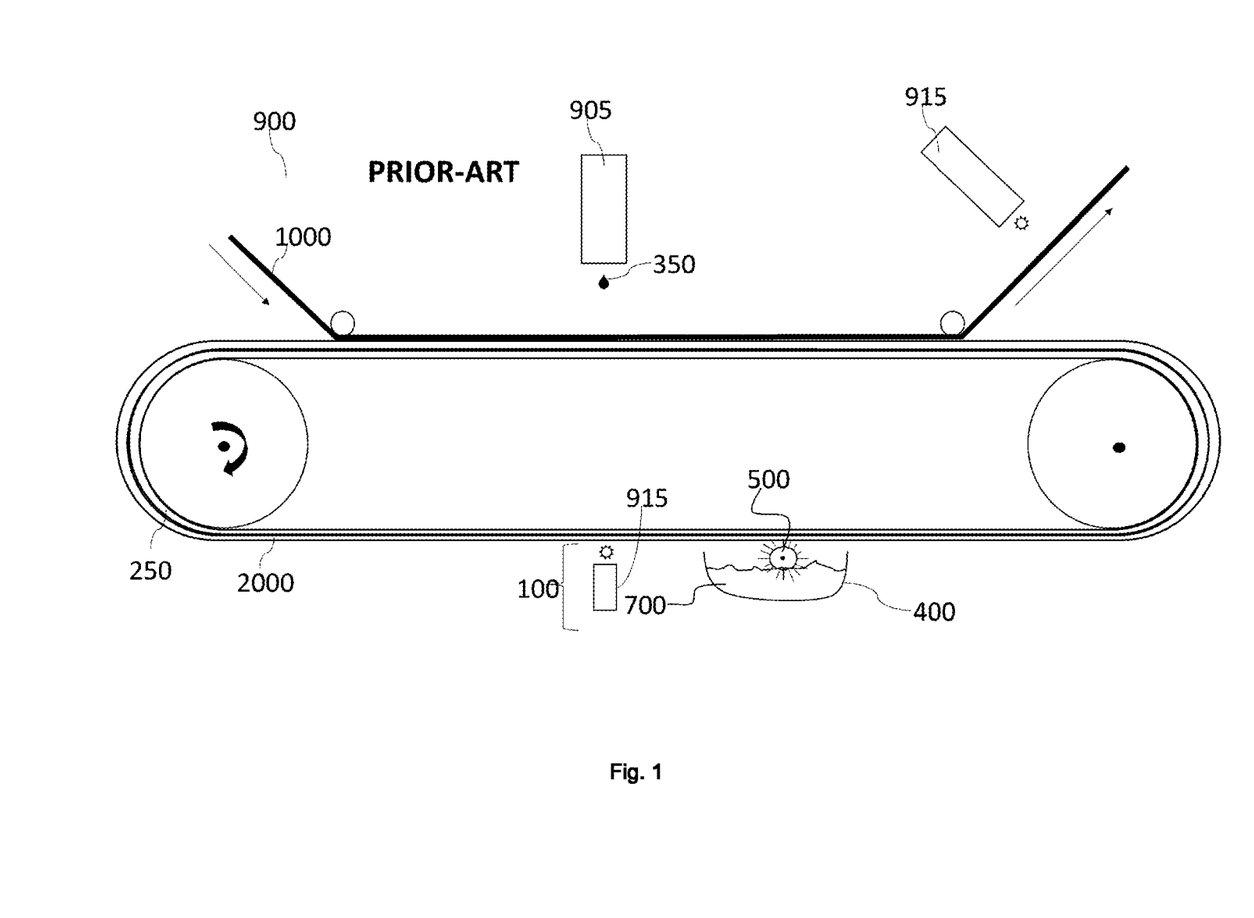
FIG. 1 is a cross section of a prior-art inkjet-printer (900) with sticky-conveyor belt, which is formed by a sticky flat layer (2000) and conveyor belt (250). A flat substrate (1000), which is here illustrated as a web, is a transported on this conveyor-belt (250) for marking a pattern with an inkjet-printing-liquid (350) by an inkjet-print-head (905). After marking the inkjet-printing-liquid (350) jetted on the flat substrate (1000) is dried by a dryer (915). The inkjet-printer (900) comprises a sticky-layer-cleaner (100) for removing residues on the sticky flat layer (2000) by a cleaning-roll (500), which comprises a brush with long stiff hairs which rotates in a receptacle (400), which comprises a cleaning-liquid (700). For drying the wet sticky flat layer (2000), the sticky-layer-cleaner (100) comprises a dryer (915). The receptacle comprises a cleaning-liquid (700). The arrow in the pulleys from the belt conveyor illustrates the rotation of the pulley to move the conveyor belt (250). The arrows along the flat substrate (1000) illustrates the transport direction of the flat substrate.
Figure 2:
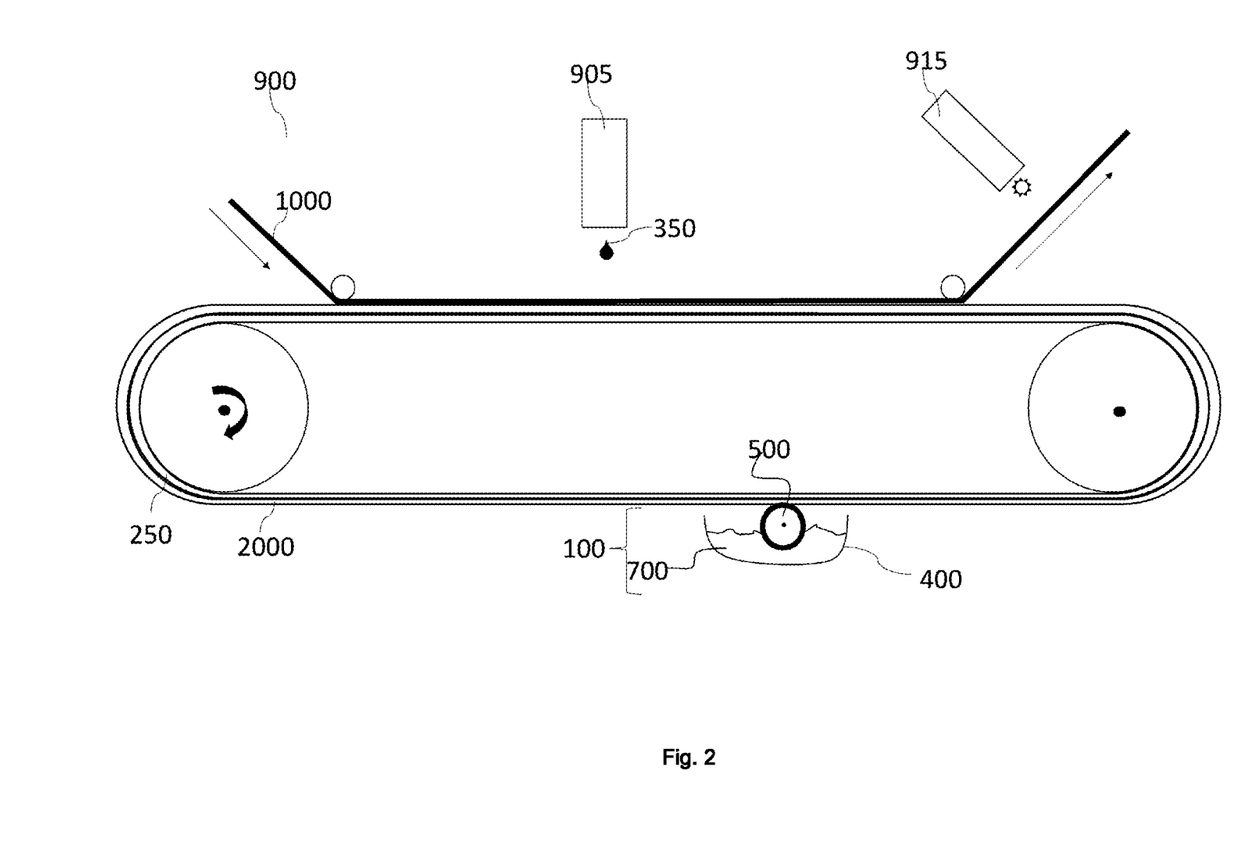
FIG. 2 is a cross section of a preferred embodiment from the present invention, namely an inkjet-printer (900) and sticky-layer-cleaner (100) wherein the cleaning-roll (500) comprises a circumferential covering of carpet fabric (2500).
Figure 3:
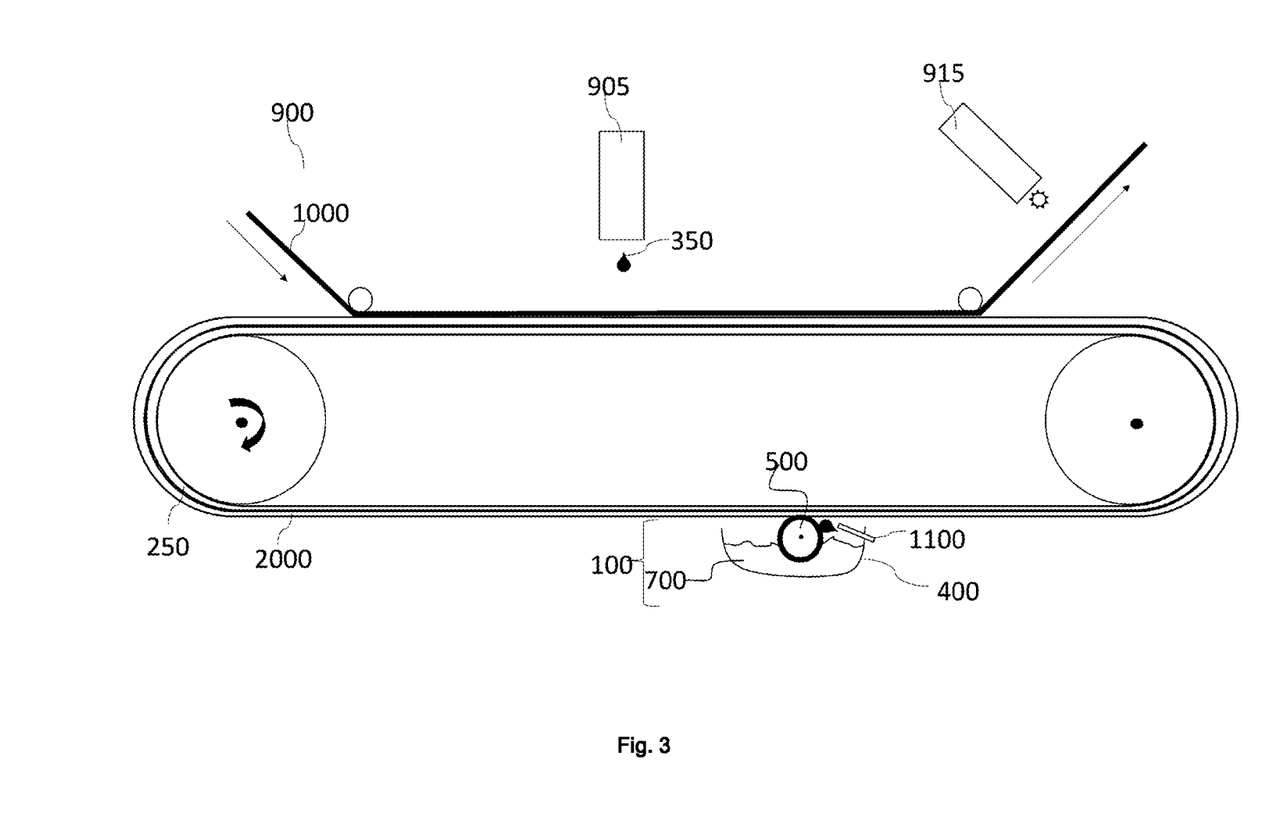
FIG. 3 is a cross section of a preferred embodiment from the present invention, namely an inkjet-printer (900) and sticky-layer-cleaner (100) wherein the cleaning-roll (500) comprises a circumferential covering of carpet fabric (2500) and a liquid sprayer (1100) oriented towards the sticky flat layer and the cleaning-roll (500). The cleaning-roll (500) comprises a circumferential covering of carpet fabric (2500).
Figure 4:
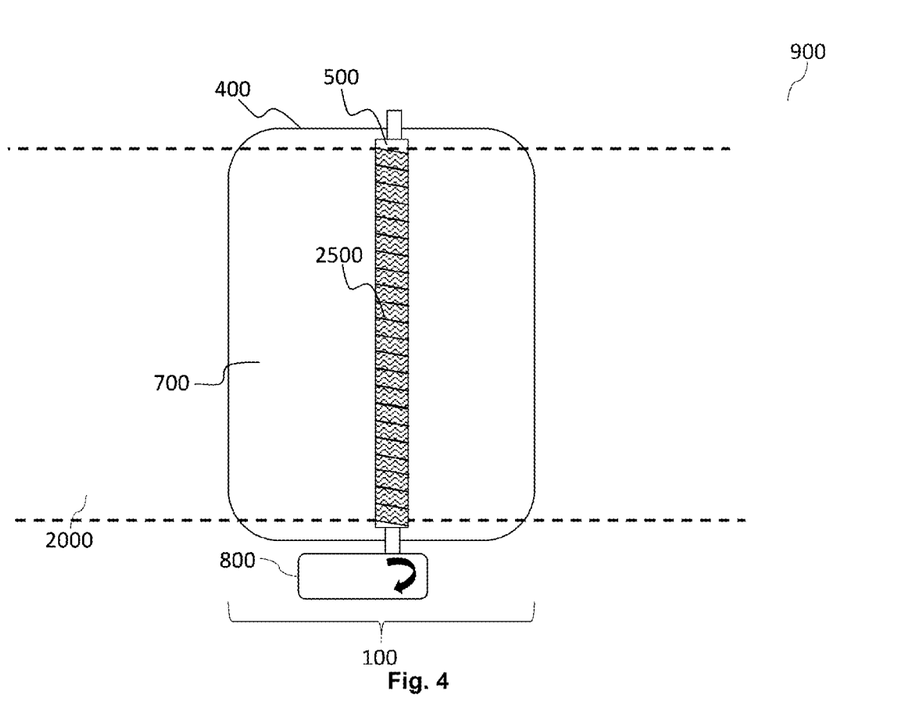
FIG. 4 is a top view of a preferred embodiment from the present invention, namely a sticky-layer-cleaner (100) for cleaning a sticky flay layer (2000), which is positioned on top of the sticky-layer-cleaner (100) and illustrated as dotted line. The sticky-layer-cleaner (100) comprises an elongated carpet fabric (2500) which is helically folded around the cleaning-roll (500). The cleaning-roll (500) is rotatable by a washing-motor (800) in one direction. The sticky-layer-cleaner (100) comprises a receptacle (400) which comprises a cleaning-liquid (700). The sticky-layer-cleaner (100) is built in an inkjet-printer (900), which is not visible in this figure.
Figure 5:
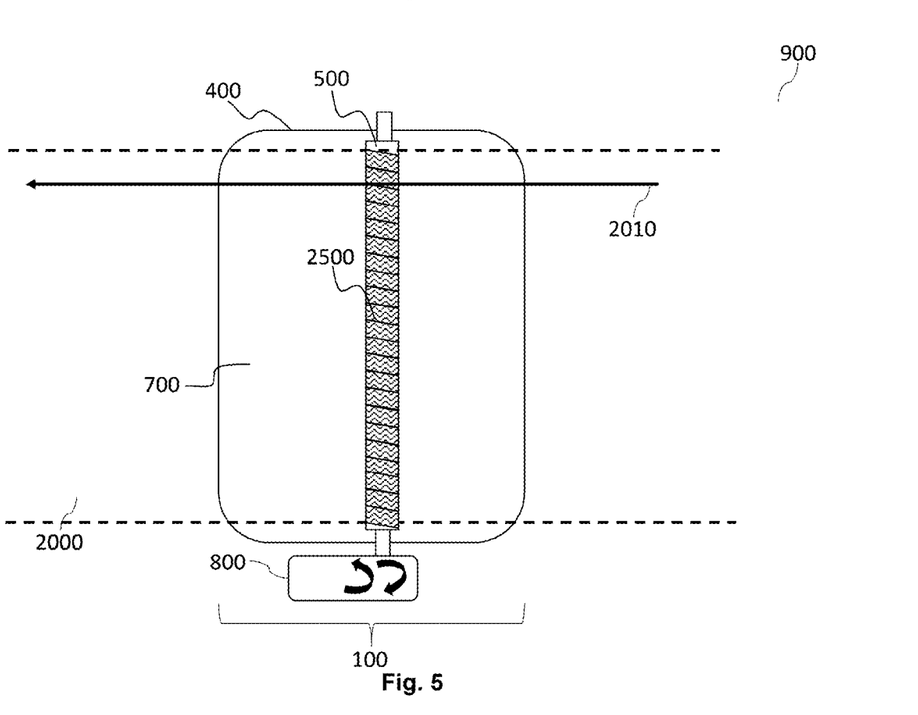
FIG. 5 is a top view of another preferred embodiment from the present invention wherein the washing-motor (800) is capable to rotate the cleaning-roll in two rotation directions, which are illustrated as arced arrows. The sticky flat layer (2000) is illustrated as movable above the sticky-layer-cleaner (100) in a moving direction (2010).
Figure 6:
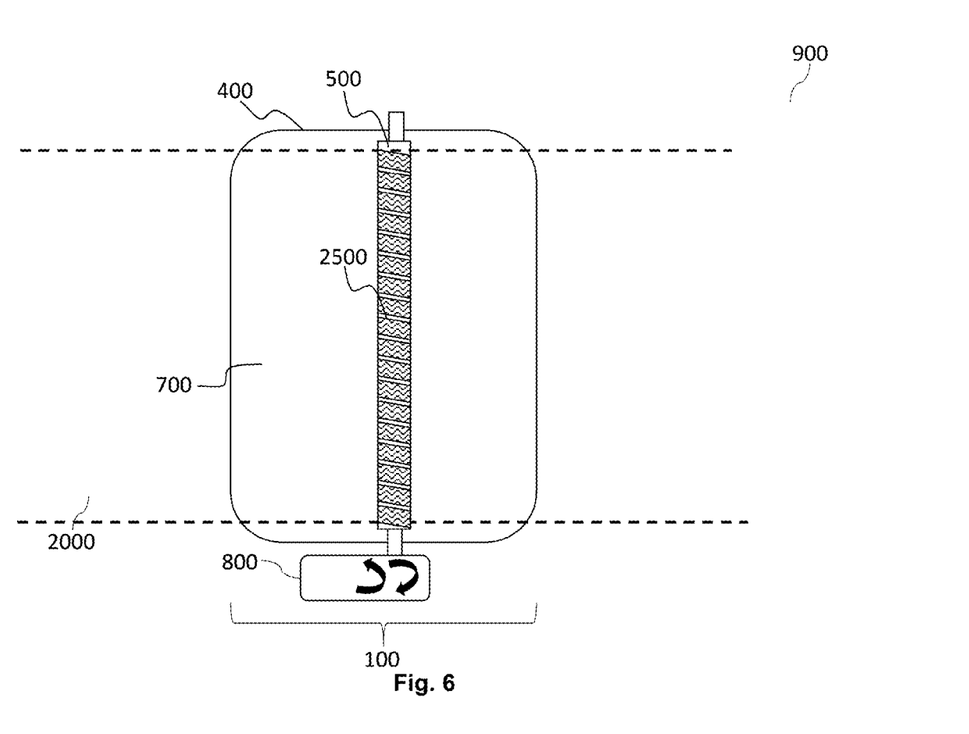
FIG. 6 is a top view of another preferred embodiment from the present invention wherein a larger helical channel is formed along the length of the enfolded carpet fabric (2500).
Figure 7:
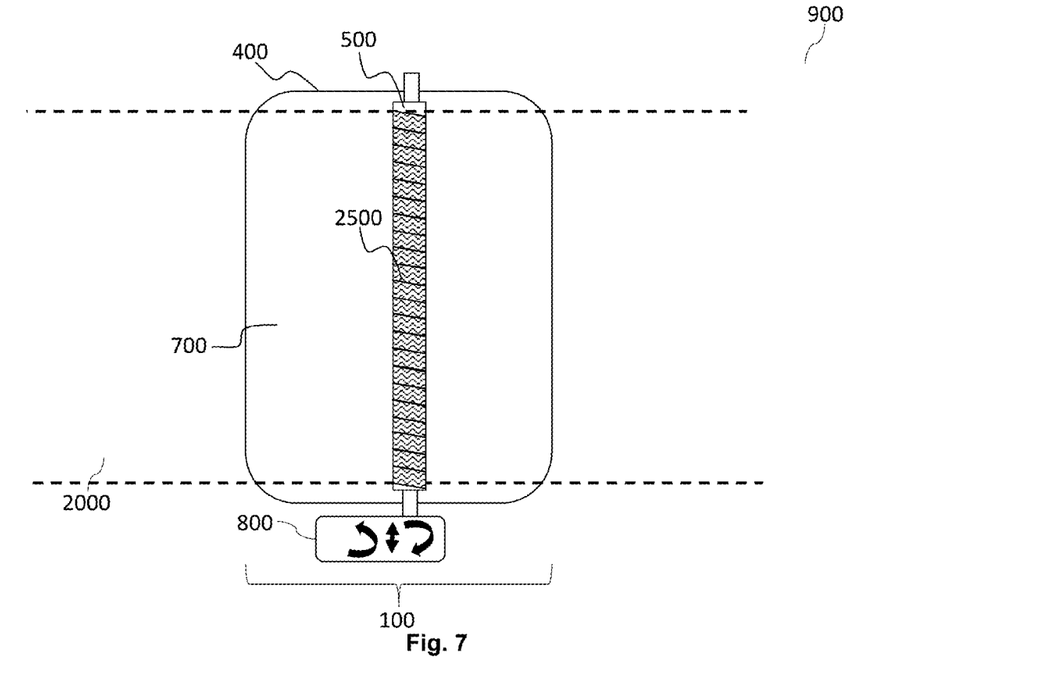
FIG. 7 is a top view of a preferred embodiment from the present invention wherein the cleaning-roll is axial movable by the washing-motor (800). The axial moving directions is illustrated as a straight double arrow in the illustration of the washing-motor (800).
Figure 8:
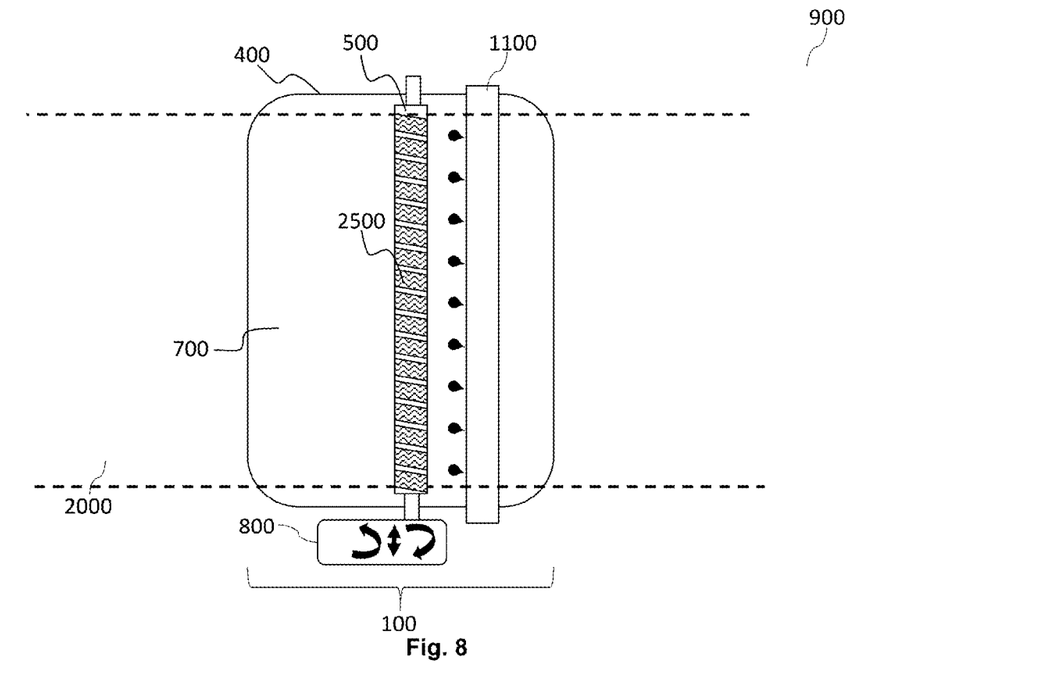
FIG. 8 is a top view of a combination of the preferred embodiments, illustrated in FIG. 6 and FIG. 7 wherein additional a liquid sprayer (1100) is attached and oriented towards the sticky flat layer and the cleaning-roll (500).
Figure 9:
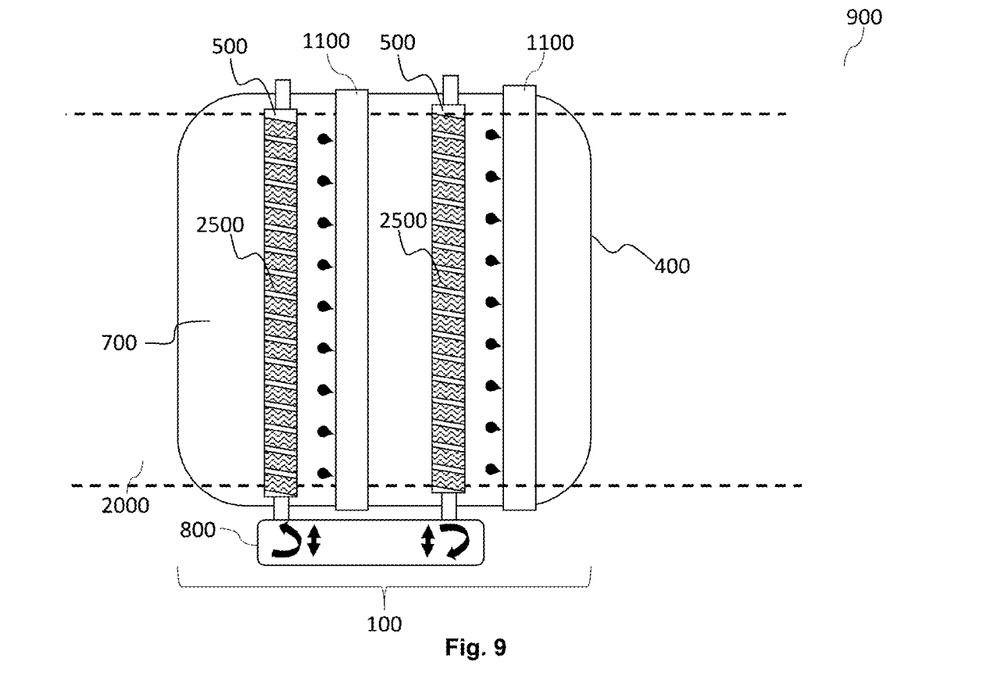
FIG. 9 is a top view of a preferred embodiment wherein two cleaning-rolls are comprised in the sticky-layer-cleaner (100) whereof each has its own liquid sprayer (1100). The washing-motor enables a different rotation direction between the two cleaning-rolls (500), as is illustrated by the arced arrows at each cleaning-roll (500).
Figure 10:
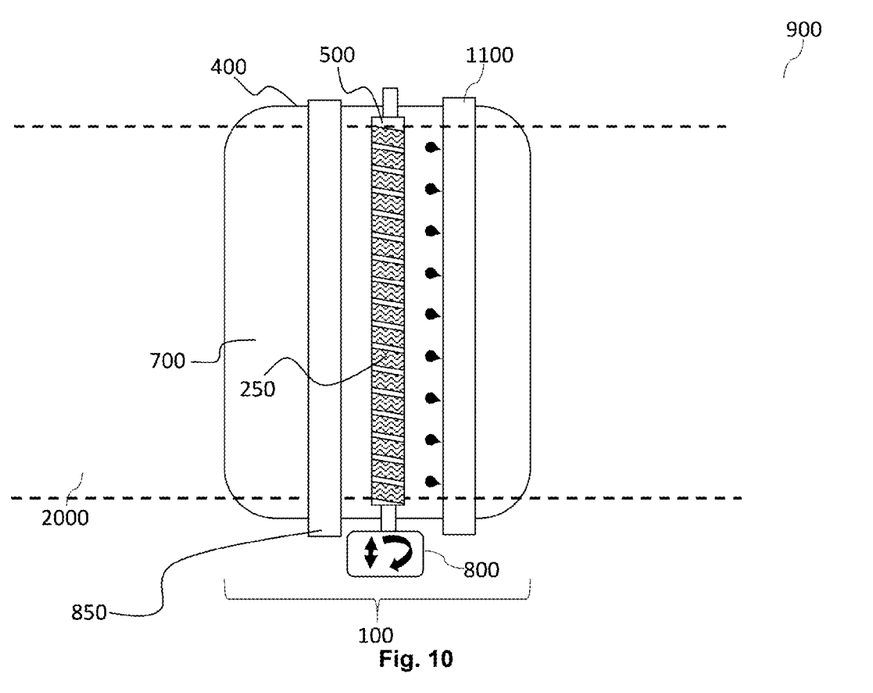
FIG. 10 is a top view of a preferred embodiment, similar as FIG. 8 wherein an extra cleaning liquid sucker (850) is built in the sticky-layer-cleaner (100).

A conveyor-belt (250) is a transport medium of a belt conveyor system. This is a well-known transport system, also called a belt-conveyor. The conveyor-belt (250) is wrapped around minimum two pulleys.

Preferably the conveyor-belt (250) has two or more layers of materials wherein an under layer provides linear strength and shape, also called the carcass and an upper layer called the cover or the support-side. The carcass is preferably a woven fabric web or knitted fabric web and more preferably a woven/knitted fabric web comprising polyester, nylon, glass fabric or cotton. A fabric as carcass is preferred due the long-life force and durability; even the conveyor-belt (250) is washed in a humid environment.

The material of the cover comprises preferably various rubber and more preferably plastic compounds and most preferably thermoplastic polymer resins. An example of a multi-layered conveyor belt for a general belt conveyor system wherein the cover having a gel coating is disclosed in US 20090098385 A1 (FORBO SIEBLING GMBH).

Preferably the conveyor-belt (250) comprises glass fabric or the carcass is glass fabric and more preferably the glass fabric, as carcass, has a coated layer on top comprising a thermoplastic polymer resin and most preferably the glass fabric has a coated layer on top comprising polyethylene terephthalate (PET), polyamide (PA), high-density polyethylene (HDPE), polytetrafluoroethylene (PTFE), polyoxymethylene (POM), polyurethaan (PU) and/or Polyaryletherketone (PAEK). The coated layer may also comprise aliphatic polyamides, polyamide 11 (PA 11), polyamide 12 (PA 12), UHM-HDPE, HM-HDPE, Polypropylene (PP), Polyvinyl chloride (PVC), Polysulfone (PS), Poly(p-phenylene oxide) (PPOTM), Polybutylene terephthalate (PBT), Polycarbonate (PC) and/or Polyphenylene sulphide (PPS). The advantage of thermoplastic polymers is their resistance against adhesives when used as coated layer on a conveyor-belt (250) whereon the coated layer the adhesive is applied to have a sticky-conveyor-belt.

Preferably, the conveyor-belt (250) is an endless conveyor-belt (250). Examples and figures for manufacturing an endless multi-layered conveyor-belt (250) for a general belt conveyor system are disclosed in EP 1669635 B (FORBO SIEBLING GMBH). If the conveyor-belt (250) in the present invention has a stitch by the two edges—thus not an endless conveyor-belt (250)—than this may give shocks and vibrations in the sticky-layer-cleaner (100) which decreases the cleaning power and increases foam forming the receptacle (400).

Preferably, the top-surface of the conveyor-belt (250) is flat. The flatness is preferably below 500 μm and more preferably below 400 μm, most preferably between 0 and 250 μm. The average roughness (Ra) of the top-surface of the conveyor-belt (250) is preferably lower than 200 μm and more preferably below 150 μm, most preferably between 0 and 100 μm. A rough top-surface has difficulties for cleaning the conveyor-belt (250) when it is spoiled with inkjet-printing-liquid residues or small dust particles received from the flat substrate (1000). It is seen that dried inkjet-printing-liquid or semi-dried inkjet-printing-liquid on such roughed support-side of a conveyor-belt (250) by rotation around the pulleys gives flakes, cracks of dried inkjet-printing-liquid, which contaminates wet inkjet-printing-liquid layers and/or creates dust in an industrial environment and/or gives nozzle failures in a inkjet-print-head (905).

A layer of neutral fibres in the conveyor-belt (250) is preferably constructed at a distance from the bottom surface between 2 mm and 0.1 mm, more preferably between 1 mm and 0.3 mm. This layer with neutral fibres is of big importance to have a straight conveying direction with minimal side force on the conveyor-belt (250) and/or minimized fluctuation of the pitch Line of the conveyor-belt (250) for high printing precision transportation. This layer of neutral fibres in the conveyor belt (250) is preferred when a sticky-layer-cleaner (100) is used in the present inkjet-printer (900) to minimize the vibrations of the sticky-conveyor-belt while cleaning the residues from the sticky flat layer (2000) by using a conveyor-belt (250) as disclosed in this paragraph.

The top surface of the conveyor-belt (250)—thus the cover whereon the flat substrates (1000) are carried—comprises preferable hard urethane with a preferred thickness (measured from top surface to bottom surface) between 0.2 to 2.5 mm. The total thickness (measured from top surface to bottom surface) of the conveyor-belt (250) is preferably between 1.2 to 7 mm. The top-surface is preferably high resistance to solvents so the inkjet printing device (100) is useful in an industrial printing and/or manufacturing environment. This makes the conveyor-belt (250) strong to carry heavy flat print-receivers but also have a strong tear strength (preferably between 100 and 300 N/mm); a high maximum operational temperature (preferably between 50 and 90° C.); a shore hardness of the top surface between 80 and 120 Shore A); and/or a light weight for easy manufacturing the inkjet-printer between 1.8 and 4 kg/m2. These specifications in this paragraph are important when acid cleaning-liquids or hot cleaning-liquids are used.

The input of the flat substrate (1000) in a belt-conveyor is where the flat substrate (1000) comes on, also called entering, the conveyor-belt (250). The output of the flat substrate (1000) in a belt-conveyor is where the flat substrate (1000) leaves the conveyor-belt (250).

Sticky-Conveyor-Belt

A sticky-conveyor-belt is a conveyor-belt (250) as described above comprising a sticky support-layer wherein a flat substrate (1000) is transported for printing. The sticky support-layer does not have to be a continuous layer on the conveyor-belt (250). The sticky-conveyor-belt may comprise a plurality of sticky support-layers, spread over the top-surface of the conveyor-belt (250).

The sticky support-layer may comprise a permanent adhesive; also called cold adhesive or cold glue. An example is ADESIVO™ 642 from ATR CHEMICALS™ (www.atr-chemicals.com). Permanent adhesives are already tacky at room temperature (+/−20° C.).

The sticky support-layer may comprise pressure sensitive adhesive, also abbreviated by PSA, which is an adhesive which stick the material of the sticky conveyor belt and the flat substrate (1000) to each other by applying a pressure so it doesn't require a chemical reaction to develop adhesion forces.

The sticky support-layer may comprise a fibrillar adhesive system more preferably synthetic setae; whether or not with an adhesive as in the previous preferred sticky support-layers; to hold the flat substrate (1000) stable while printing on the flat substrate (1000). Holding the flat substrate (1000) stable while printing on the flat substrate (1000) is necessary e.g. to avoid misalignment or color shifts in the printed pattern on the flat substrate (1000). The fibrillar adhesive system may be emulations of adhesive systems of the toes of a beetle, fly, spider or gecko. The synthetic setae are emulations of setae found on the toes of geckos. More information on this type of sticky-conveyor-belt and its advantages are disclosed in WO2015110350 (AGFA GRAPHICS NV). Commercial implementations of such dry adhesive technology are nanoGriptech's Setex™ (http://nanogriptech.com/products/dry-adhesives) and Geckskin™ (https://geckskin.umass.edu/). It is found that a fibrillar adhesive system on a conveyor-belt (250), as sticky-conveyor-belt, is less dependent on the type of flat substrate (1000). By applying of an adhesive on a conveyor-belt (250) to have a sticky-conveyor-belt the chemistry of the adhesive is usually selected on the type of flat substrate: for example permanent adhesives for cotton and thermoplastic adhesives for synthetic fabrics.

Inkjet-Printer (900)

An inkjet-printer (900) is a device, which marks a pattern on a surface of a flat substrate (1000) such as paper. The marking of a pattern on a surface is also called printing. The pattern represents an image, which may be text, photograph, graphic or logo. The pattern is mostly the result of a halftoning method of the image such as an error-diffusion method or an amplitude modulation halftoning method. The pattern may have an achromatic or chromatic color.

An inkjet-printer (900) is a digital printing device, such as a electrophotography-based, devices, iconography-based, magnetography-based, inkjet-based printing device. A digital printing device is sometimes called a printer. These digital printing methods are described in '*Chapter 4. Printing Computer to . . . Technologies*', '*Subchapter 4.5 Computer to Print*", P657-674, and 'Chapter 5. Printing Technologies without a Printing Plate (NIP Technologies)', P676-758 in '*Handbook of Print Media, Technologies and Production Methods*' by Helmut Kipphan, ISBN 3-540-67326-1 Springer-Verlag Berlin Heidelberg New York, 2001. The printing device may also be a hybrid printing device wherein conventional printing technologies and digital and/or non-impact printing technologies are combined in a printing device.

The printing technology for the present invention is an inkjet printing technology. The printing device from the present invention is thus an inkjet-printer (900), which is a digital printing device comprising an inkjet-print-head (905). The inkjet technology may be continuous inkjet or drop on demand inkjet, which is preferably selected from the group thermal inkjet, piezo inkjet, and electrostatic inkjet.

The inkjet-printer (900) is preferably a large-format inkjet-printer (900) wherein printable width of more than 135 cm are common but also printable widths of more than 300 cm and even more than 500 cm until 10 meter. An example of such large-format inkjet printer in a multi-pass inkjet printing method is Jeti Tauro™ manufactured by Agfa Graphics™ with a maximum printable width of 254 cm and which can accommodate for example rigid media up to 400 cm in length. An example of another large-format inkjet printer with a single-pass inkjet printing method is KBA RotaJet™ L-series with a maximum print width of 1.3 meter.

The inkjet-printer (900) may comprise a page-wide inkjet-print-head which covers the whole width or larger than the width of the print receiver. In a preferred embodiment, the pattern is inkjet printed in one pass, also called single-pass inkjet printing method, which guarantees an economical benefit by having larger throughputs than in a multi-pass inkjet printing method. Such an inkjet-printer (900) is called a single pass inkjet-printer. Detailed information on inkjet technologies and building-up of inkjet printers can be found in '*Inkjet Technology and Product Development Strategies*' by Stephen F. Pond, Torrey Pines, 2000.

To enhance the adhesion of the pattern on the flat substrate (1000) the inkjet-printer (900) may comprise a dryer to dry the marked pattern on the flat substrate (1000) and/or to have a better adhesion of the marked pattern on the flat substrate (1000). A typical dryer, sometimes also called curing device, in such inkjet-printers (900) comprises an ultraviolet light (UV) source and/or infrared (IR) radiation source.

In a preferred embodiment is a dryer, sometimes also called fixer, attached to the inkjet-printer (900), nearby, at or after the output of the inkjet printed flat substrate (1000) so the sticky-conveyor-belt, more specific the sticky flat layer (2000) is not contaminated with dried, fixed or cured inkjet-printing-liquid, which are more difficult to remove.

The drying of the marked pattern may be done by radiation (UV and/or IR and/or NIR and/or SWIR) from the backside to the printed side of the flat substrate (1000). Alternatively, the drying of the marked pattern may be done by radiation (UV and/or IR and/or NIR and/or SWIR) above the marked pattern. The drying, sometimes called fixing, of a marked pattern may be performed by a heat treatment having a certain temperature and duration which is adjusted to the type of the flat substrate (1000), such as textile, and the reactivity of the thermal chemistry of the inkjet-printing-liquid. Such thermal treatments are today already used with other types of inkjet-printing-liquid and their implementation is well known in the art. For example, reactive dye inkjet-printing-liquids often receive a thermal treatment of 8 to 10 minutes at 100° C., for example by steaming. For disperse dye inkjet-printing-liquids often higher temperatures are used at a shorter time, e.g. 1 minute at 200° C. The thermal fixing can be performed by a heat treatment applied by an oven, heated rollers, steaming and the like.

Any ultraviolet light source, as long as part of the emitted light, may be employed as a radiation source, such as a high or low pressure mercury lamp, a cold cathode tube, a black light, an ultraviolet LED, an ultraviolet laser, and a flash light.

The IR source is preferably a NIR source (=<u>N</u>ear <u>I</u>nfra-<u>R</u>ed source) such as a NIR lamp or a SWIR (=<u>S</u>hort <u>W</u>ave <u>I</u>nfra-<u>R</u>ed source) such as a SWIR lamp. The IR source may comprise carbon infrared emitters, which has a very short response time. An IR source is also called infrared radiation source. The IR source may comprise an air blower for blowing hot air warmed up by the IR source.

Preferred infrared radiation sources include near infrared radiation sources (NIR: 750-1400 nm) and short wave infrared radiation sources (SWIR: 1400-3000 nm). A commercial example of a SWIR light source is a carbon infrared emitter CIR™ available from HERAEUS™, for example emitting at a wavelength of about 2000 nm. Commercially available NIR emitters are available from ADPHOS™.

Flat Substrate (1000)

The print side of a flat substrate (1000) is the side whereon the printing device marks a pattern on the flat substrate (1000). The backside of a flat substrate (1000) is the side, which is in contact with the printing device, especially a conveyor belt or a vacuum table, while carrying and/or transporting the flat substrate (1000). A flat substrate (1000) is a flat print receiver with a maximum thickness of 4 cm. A flat substrate (1000) has mostly a rectangular shape.

The flat substrate (1000) is preferably web material, which is carried from a roll on a sticky-conveyor-belt from the inkjet-printer (900) in the present invention. If the marked flat substrate (1000) is winded on another roll, the configuration is called roll-to-roll. If the marked flat substrate (1000) is cut in marked sheets by a cutter, the configuration is called roll-to-sheet. The inkjet-printer (900) from the present invention is comprises preferably such a roll-to-roll configuration or roll-to-sheet configuration.

The present invention and embodiments with the inkjet-printer (900) are a big advantage for flat permeable print receivers such as liquid permeable print receivers. The sticky-conveyor-belt of the inkjet-printer (900) becomes dirt by the marking of the permeable flat substrate (1000). Typical permeable print receivers and preferred embodiments are textiles, cotton, cloth, flag fabrics, knitted polyester fabrics and flexible material comprising a network of natural or artificial fibres (yarn or thread).

The present invention and embodiments with the inkjet-printer (900) are a big advantage for absorbent print receivers. The sticky-conveyor-belt of the inkjet-printer (900) becomes dirt or soiled by the marking of the absorbent flat substrate (1000), if for example inkjet-printing-liquid may not absorbent enough by the absorbent flat substrate (1000) so the inkjet-printing-liquid is absorbed until the backside of the absorbent flat substrate (1000). The inkjet-printing-liquid may be aggressive, for example due to a high pH of the inkjet-printing-liquid so a sticky-layer-cleaner (100) is needed to remove the inkjet-printing-liquid on the sticky flat layer (2000) of the sticky-conveyor-belt to enhance the lifetime of the sticky-conveyor-belt and/or the lifetime of stickiness of the sticky flat layer (2000).

Crease-sensitive print receivers are print receivers grouped together, which easily crease, wrinkle, crumple and/or rumple when handled in a printing device, which affects badly the print quality of the marked pattern on the flat substrate (1000). Examples and preferred embodiments of such flexible films and sheets are textile, dye sublimation transfer paper, transfer foil, shrink foil, stretch wrap, plastic wrap, cling wrap, food wrap aluminium foil wax paper, cotton, cloth, flag fabrics, knitted polyester fabrics and flexible material comprising a network of natural or artificial fibres (yarn or thread). The opposite word for crease-sensitive is sometimes called crease-resistant, wrinkleproof or wrinkle-resistant.

The inkjet-printer (900) may comprise a flattener to flatten a crease-sensitive flat substrate (1000), such as textile, before marking the crease-sensitive flat substrate (1000) to avoid bad print quality on non-flattened portions of such print receivers. The bad print quality is for example caused because the difference between the marking device, such as an inkjet-print-head (905), and the flat substrate (1000) gives a different result of marking. Examples of such crease-sensitive flat substrates (1000) and preferred flat substrates (1000) are flexible film with a thickness below 100 micrometers, preferably below 50 micrometers or flexible sheet with a thickness below 100 micrometers, preferably below 50 micrometers, dye sublimation transfer paper, transfer foil, shrink foil, stretch wrap, plastic wrap, cling wrap, food wrap aluminium foil wax paper.

Print quality of marked patterns can easily be determined and compared. More information about print quality is disclosed in Pedersen Marius: "Image quality metrics for the evaluation of printing quality", Image Quality and System Performance VIII, edited by Susan P. Farnand, Frans Gaykema, Proc. of SPIE-IS&T Electronic Imaging, SPIE Vol. 7867, 786702 • © 2011 SPIE-IS&T • CCC code: 0277-786X/11/$18 • doi: 10.1117/12.876472 and tools for inspection of print quality can be performed by hardware tools and software tools of imageXpert™ (www.imagexpert.com).

Brittle print receivers are print receivers grouped together, which are brittle, splintery, crackable and/or easily breakable. Examples of such print receivers and preferred embodiments are glass, cement panels, fiber cement panels, ceramics or coated resin impregnated paper. Such print receivers contaminates a sticky-conveyor-belt very easily by dust from the print receiver.

If the flat substrate (1000) is a resin impregnated paper, the paper is provided with an amount of resin, more particularly is soaked in resin and/or is impregnated with resin. The resin is preferably a thermosetting resin and more preferably, a melamine based resin and most preferably, a melamine formaldehyde based resin with formaldehyde to melamine ratio of 1.4 to 2. Other thermosetting resins may be ureum-formaldehyde based resins and phenol-formaldehyde based resins. Such melamine impregnated paper, which is brittle, is for example used in the manufacturing of decorative laminates. The printing method and inkjet-printer (900} of the present invention is preferably part of the manufacturing of decorative workpieces and a decorative laminate manufacturing line.

In a preferred embodiment, the decorative laminates are selected from the group consisting of kitchen panels, flooring panels, furniture panels, ceiling panels and wall panels. The decorative laminates may be rigid sheets but may also be rolls of a flexible flat substrate (1000). The manufacturing of a decorative laminate comprises the following step: printing a first decorative layer by the present invented printing device and delivering the printed decorative layer to a laminate heating press where it is heat pressed, preferably by a Direct Pressure Laminate process, into a decorative laminate.

Rough backside print receivers are print receivers grouped together which have a rough backside. By roughness is meant the surface roughness. The backside is the opposite of the front-side whereon the pattern is marked. The average roughness Ra of these rough backside print receivers is between 2 µm to 300 µm or between 5 µm to 100 µm or between 8 µm until 75 µm. Examples and preferred embodiments of rough backside print receivers are textured packaging material; semiconductor wafers and leather. Ra is the arithmetic average of the absolute values of the roughness profile ordinates, also known as Arithmetic Average (AA), Center Line Average (CLA). The average roughness is the area between the roughness profile and its mean line, or the integral of the absolute value of the roughness profile height over the evaluation length.

Textile is a crease-sensitive flat substrate (1000) and permeable flat substrate (1000). Fabric comprises cellulose fibres. The fabric can be made for 100% of cellulose fibres (cotton, rayon, viscose) or from cellulose fibres and at least one fibre material selected from the group of nylon, polyester, acryl, lactate, acetate, silk, wool, hemp, glass and spandex (Elastan). Textile as flat substrate (1000) is preferably selected from the group consisting of cotton textiles, silk textiles, flax textiles, jute textiles, hemp textiles, modal textiles, bamboo fibre textiles, pineapple fibre textiles, basalt fibre textiles, ramie textiles, polyester based textiles, acrylic based textiles, glass fibre textiles, aramid fibre textiles, polyurethane textiles, high density polyethylene textiles and mixtures thereof.

Leather is genuine leather, also called natural leather, and thus not imitation. Imitated leather, also called fake leather, is been made to resemble genuine leather. The great bulk of these imitations are rubber or plastic-coated fabrics. It is unlawful to use terms connoting leather to describe imitations. Leather is an animal skin, which has been preserved and dressed for use. Leather is an edge curl sensitive flat substrate (1000) and rough backside flat substrate (1000).

The leather as flat substrate (1000) is preferably a hide leather coming of several animals; preferably selected from the group comprising: cow; goat; horse; alligator; snake; crocodile; sheep or calf.

Plastic foil is a typical crease-sensitive flat substrate (1000). The thickness of a plastic foil is preferably between 20 and 200 µm, more preferably between 50 and 100 µm and most preferably between 60 to 80 µm. Plastic foils are generally heat-sensitive flat substrates (1000). Plastic foil may comprise polyvinyl chloride (PVC), polyethylene (PE), low-density polyethylene (LDPE), polyvinylidene chloride (PVdC).

The inkjet printing method by the inkjet-printer (900) from the present invention may comprise one or more of the following steps: flat substrate (1000) pre-treatment, drying, curing, fixing and optionally post treatment.

The present invention may be part of a transfer printing method wherein the marked flat substrate (1000), is transferred onto other receivers, such as various synthetic fabrics for example by heat, time and pressure, more preferably the present invention may be part of a dye sublimation method wherein jetted liquid comprising disperse dye marked on the flat substrate (1000), is sublimated and fixed to a fabric by heat between 100 and 300° C. Such a fabric is selected from a group comprising 100% polyester, nylon, acrylic blends of polyester and synthetic blends of polyesters.

Sticky-Layer-Cleaner (100)

The sticky-layer-cleaner (100) removes residues on a sticky flat layer (2000), such as the sticky support-layer of a sticky-conveyor-belt.

The residues adhered to the sticky flat layer (2000) may be dust, e.g. from the environment in production or from a flat substrate (1000) which was supported by the sticky flat layer (2000). It may also be fibres from a flat substrate (1000) which was supported by the sticky flat layer (2000) or inkjet-printing-liquid residues from an inkjet-printing-liquid after inkjet printing that inkjet-printing-liquid on a flat substrate (1000) which was supported by the sticky flat layer (2000). These inkjet-printing-liquid residues may be inkjet-printing-liquid splashes, dried inkjet-printing-liquid, cured inkjet-printing-liquid, inkjet-printing-liquid mist or inkjet-printing-liquid transferred from the print-side of the flat substrate (1000) via its backside to the sticky flat layer (2000), whereon the flat substrate (1000) was supported for printing.

Other residues adhered to the sticky flat layer (2000) are fluff, pile, wool or nap, flakes of dried inkjet-printing-liquid.

The sticky-layer-cleaner (100) from the present invention is removed by a specific cleaning-roll (500), which comprises an elongated carpet fabric (2500) which is helically folded around the cleaning-roll (500) and in which the pile is composed of yarn tufts in loop and/or cut configuration; and wherein preferably the cleaning-roll (500) comprises a helical channel along the length of the enfolded carpet fabric (2500) for draining the cleaning-liquid (700) from the cleaning-roll (500) and/or for wetting the cleaning-roll (500) by the cleaning-liquid (700).

For a sake of clarity the cleaning-roll (500) removes the residues adhered to a sticky flat layer (2000) and the sticky flat layer (2000) remains substantially the same before and after washing of the sticky flat layer (2000).

The sticky-layer-cleaner (100) may comprise more than one of such cleaning-rolls, namely a set of cleaning-rolls, which are arranged parallel and contactless next to each other. Towards each cleaning-roll (500) may another liquid-sprayer (1100) be arranged. The rotation speed of each cleaning-roll (500) in a receptacle (400) and/or rotation direction of each cleaning-roll (500) in the receptacle (400) may be different.

If the sticky flat layer (2000) is part of a sticky-conveyor-belt the rotation direction of a cleaning-roll (500) in a receptacle (400) may be in the same direction of the movement of the sticky-conveyor-belt or in the opposite direction of the movement of the sticky-conveyor-belt to enhance the cleaning power.

If the sticky flat layer (2000) is part of a sticky-conveyor-belt the rotation speed of a cleaning-roll (500) in a receptacle (400) may be higher than the rotation speed of the sticky-conveyor-belt to enhance the cleaning power for removing residues from the sticky flat layer (2000). The helically folded carpet fabric (2500) around the cleaning-roll (500) makes that carpet fabric (2500) and the helical channel from the present invention are angled towards the movement of the sticky flat layer (2000). It is found that this helical folding makes that the cleaning power for removing residues from the sticky flat layer (2000) is enhanced without damaging the sticky flat layer (2000).

In a preferred embodiment is the fabric density of the carpet fabric (2500) on a cleaning-roll (500) differently, preferably higher, than the following cleaning-roll (500) in these set of parallel-arranged cleaning-rolls (500).

The elongated carpet fabric (2500) preferably have an adhesive back layer, so the elongated carpet fabric (2500) may be glued in a helical way enfold around the cleaning-roll (500). The remaining edges of the elongated carpet fabric (2500) on the cleaning-roll (500) may be sealed with a glue to prevent that piles from the carpet fabric (2500) shall become loose and shall contaminate the cleaning-liquid (700) in the receptacle (400).

The sticky flat layer (2000) may comprise a liquid absorbing roll and/or squeegee and/or cleaning liquid sucker (850) for removing waste cleaning-liquid (700) more efficiently after the cleaning of the sticky flat layer (2000) by a cleaning-roll (500). In a preferred embodiment is the liquid absorbing roll arranged in an open box, next to the receptacle, which is filled with heated air to remove cleaning-liquid (700) even more from sticky flat layer (2000). For the same purpose, the liquid absorbing roll may be heated. It is found that such drying methods are not necessarily needed due to less use of cleaning-liquid (700) by the present invention.

A roll comprised in a sticky-layer-cleaner (100), such as the cleaning-roll (500) or a liquid absorbing roll, may be driven by a drive motor, also called washing-motor (800), for rotating the roll by for example drive system with chains, roller bearings and a gear. The rotation-direction of the roll is predetermined. Preferably, the rotation direction is opposite to the conveying direction of the sticky-conveyor-belt, which comprises a sticky flat layer (2000) from the present invention.

The receptacle (400) is an open box preferably made in metal wherein an outlet is arranged for draining the cleaning-liquid (700). There may also be an inlet for filling the receptacle (400) with the cleaning-liquid (700), but the filling may also be done or in addition be done by a liquid-sprayer (1100).

Carpet Fabric (2500)

Carpet fabric (2500) is a kind of brush and a brush is a tool with a plurality of hairs, also called bristles, wire or filaments. The brush is used for cleaning a surface. Contamination passing the brush is captured and may be held by the plurality of hairs.

The circumferential covering of carpet fabric (2500) is applied onto a portion or totally on the outer surface of the cleaning-roll (500). The cleaning-roll (500) consists preferably of a steel cylindrical body with two shaft ends. One or both shaft ends are preferably rotatable registered in slide bearings.

The filaments of the carpet fabric (2500) may comprise a fluoropolymer. It is found that if the filaments of the carpet fabric (2500) comprise a fluoropolymer; a fluorocarbon based polymer with multiple strong carbon-fluorine bond, that the carpet fabric (2500) is more resistant to residues that comprises solvents, acids, and bases.

A pile of a carpet fabric is the visible surface of the carpet fabric (2500), after attaching the primary back to a means, consisting of yarn tufts in loop and/or cut configuration. A pile of a carpet fabric (2500) is also called the face or the nap of the carpet fabric (2500).

The carpet-backing fabric of a carpet fabric (2500) is a means into which the yarn tufts are inserted. The back may be made of jute, kraftcord, cotton, woven or non-woven synthetics; preferably, the carpet-backing fabric of the carpet fabric (2500) in the embodiment preferably comprises polypropylene.

Pile height is the length (expressed in decimal parts of one inch) of the yarn tuft from the carpet-backing fabric to the top surface of the carpet fabric (2500). A carpet fabric (2500) with a higher pile height will possess more yarn on the carpet-backing fabric and will essentially be more durable. The pile height of the carpet fabric (2500) in a preferred embodiment is from 0.1 to 20 mm and preferably from 0.2 mm to 10 mm and more preferably from 0.5 mm to 5 mm and most preferably from 1 mm to 5 mm.

The carpet fabric density of the carpet fabric (2500) may be from 1000 $cm^2$ until 100000 filaments per $cm^2$; preferably be from 2000 $cm^2$ until 110000 filaments per $cm^2$.

The pile of the carpet fabric may be composed of polytetrafluoroethylene (PTFE), polypropylene (PP), polyurethane, polyester, aromatic polyamides (ARAMID), rayon, acrylic, cellulose, viscose or nylon, preferably composed of polytetrafluoroethylene (PTFE). Making the carpet fabric (2500), especially the pile, from PTFE has the advantage that the filaments of the carpet fabric (2500) are chemical inert and that cleaning part of the cleaning-roll (500), namely the helically wound carpet fabric (2500) has certain self-cleaning properties. Low hardness of the material avoids scratching of the sticky flat layer (2000).

The carpet fabric (2500), is also advantageous because it helps the cleaning process advantageous by creating a more uniform cleaning liquid flow over the sticky flat layer (2000).

Other characterization of the carpet fabric (2500) may be:
antimicrobial carpet fabric; and/or
antistatic carpet fabric; and/or
dimensional stable carpet fabric.

Liquid-Sprayer (1100)

A liquid sprayer is a spraying means, which in the above presented embodiments, is for example a spray bar or a plurality of nozzles. By power of a pump and adjustment valves, the quantity of spraying may be controlled towards the cleaning-roll (500) and/or sticky flat layer (2000). If more than one liquid sprayer is comprised in the sticky-layer-cleaner (100), it is possible that more than one pump is needed. The cleaning-liquid (700) may be sucked from the receptacle (400), from an outlet in the receptacle (400) and, after filtering the residues out the contaminated cleaning-liquid (700), re-used for spraying the cleaning-liquid (700) by the power of the pump, just like a recirculation system. Therefore, the cleaning fluid is recycled and reused after e.g. filtering or other purification methods. This preferred embodiment reduces waste generation. Such purification methods as filtering, centrifuge, distillation etc. are known in the art and need no further detailing.

The liquid-sprayer (1100) is preferably oriented by spraying or jetting the cleaning-liquid (700) between 0 and 80 degrees, more preferably between 10 and 75 degrees. Jetting or spraying the cleaning-liquid (700) with a sufficient flow helps to loosen residues that are attached to the sticky flat layer (2000). In a preferred embodiment, is the jetting or spraying of the cleaning-liquid (700) towards the sticky flat layer (2000) done by a pulsing liquid flow, which gives more efficient cleaning of the sticky flat layer (2000).

In a preferred embodiment for enhancing the cleaning power, is the liquid-sprayer (1100) more a steam-sprayer, which sprays or jets heated cleaning-liquid (700) in a gas phase towards the sticky flat layer (2000) and/or cleaning-roll (500). Therefore comprises the sticky-layer-cleaner (100) a heater for heating the cleaning-liquid (700) to a gas phase and wherein the cleaning-liquid (700) in the gas phase is sprayed or jetted towards the sticky flat layer (2000) and/or cleaning-liquid (700).

The cleaning-liquid (700) is preferably a substantially colourless liquid, such as water, more preferably a colour less liquid. It is preferred not to use any colored components in the cleaning-liquid (700), such as dyes and colour pigments. A very small amount of the latter is sufficient to cause an undesired hue on the sticky flat layer (2000). It is preferred not to use silicones in the cleaning-liquid (700) because this may decrease the stickiness of the sticky flat layer (2000).

In a preferred embodiment, the cleaning-liquid (700) comprises a surfactant to improve the cleaning of the sticky flat layer (2000) from residues.

The viscosity of the cleaning-liquid (700) is preferably smaller than 20 mPa·s at 45° C. and at a shear rate of 1,000 s$^{-1}$, more preferably between 1 and 15 mPa·s at 45° C. and at a shear rate of 1,000 s$^{-1}$.

The cleaning-liquid (700) may further also contain at least one surfactant for obtaining good spreading characteristics on the sticky flat layer (2000) for good cleaning of the sticky flat layer (2000). The surface tension of the cleaning-liquid (700) is preferably in the range of 18 mN/m to 70 mN/m at 25° C., more preferably in the range of 20 mN/m to 40 mN/m at 25° C., and most preferably in the range of 22 mN/m to 30 mN/m at 25° C.

The cleaning-liquid (700) is preferably a water based formula, preferably to solve foam problems. The cleaning-liquid (700) is preferably a disinfectant cleaning-liquid, more preferably a bactericidal and/or fungicidal cleaning-liquid.

The sticky-layer-cleaner (100) may comprise multiple receptacles wherein in each receptacle (400) rolls a cleaning-roll (500). Each receptacle (400) may comprise a different cleaning-liquid (700), for example depending on the kind of residue on the sticky flat layer (2000). The rotation speed of the cleaning-roll (500) in each receptacle (400) and/or rotation direction of the cleaning-roll (500) in each receptacle (400) may be different.

The cleaning-roll (500) and/or sticky-layer-cleaner (100) is preferably pretensioned by means of a pretensioning system such as for example a spring, and pushes with a carefully controlled pressure against the sticky flat layer (2000) so there is a gently touch between cleaning-roll (500) and sticky flat layer (2000) to avoid damaging the sticky flat layer (2000). The pressure of the cleaning-roll (500) and/or sticky-layer-cleaner (100) against the sticky flat layer (2000) is preferably in the range from 0.1N to 50.0N, even more preferably in the range from 0.1N to 5.0N, and even most preferably in the range from 0.1 to 0.5N.

Inkjet-Printing-Liquid (350)

An inkjet-printer (900} comprises an inkjet-print-head (905) which jets an inkjet-printing-liquid, which may be a dye based inkjet-printing-liquid or preferably, a pigment based inkjet-printing-liquid. Dye based inkjet-printing-liquids have several disadvantages. For example in a textile inkjet-printer, the type of dye has to be selected in function of the type of fibre of the fabric. In order to obtain good wash fastness and colourfastness, the required pre- and post-treatments, such as steaming and washing, result in a complex workflow with considerable environmental impact.

It is found that residues from inkjet-printing-liquids containing thermally reactive composite resin particles in an aqueous medium, are easier removable from the sticky flat layer (2000) than dye based inks or UV inkjet-printing-liquids because of the thermally reactive composite resin particles. The residues from these inks are preferably uncured or not-dried inkjet-printing-liquids containing these thermally reactive composite resin particles. This happens for example when the curing or drying of the jetted image on the flat substrate (1000) is not done when the flat substrate (1000) still lays down on the sticky-conveyor-belt.

In a preferred embodiment the thermally reactive composite resin particles contain:
a) at least one thermal cross-linker; and
b) at least one polymeric resin containing functional groups suitable for reacting with the thermal cross-linker; more preferably wherein the at least one thermal cross-linker is a compound functionalized with at least one functional group selected from the group consisting of an epoxide, an oxetane, an aziridine, an azetidine and a blocked isocyanate.

A composite particle is a solid mixture made of several different substances. The thermally reactive composite resin particles used in a inkjet-printing-liquid (350) according to the present invention incorporate into a solid particle at least one thermal cross-linker and at least one polymeric resin containing functional groups suitable for reacting with the thermal cross-linker.

Composite resin particles should not be confused with capsules. Capsules are composed of a polymeric shell surrounding a core. The advantage of using thermally reactive composite resin particles instead of capsules is that no polymeric shell has to be made permeable or to be broken e.g. by applying pressure. The manufacturing process of composite resin particles is also much simpler than capsules.

Composite resin particles should also not be confused with micelles, as exemplified by US 2014002556 (SEIKO EPSON) for encapsulating a liquid mixture of UV curable monomers. The use of micelles in an inkjet-printing-liquid (350) introduces high amounts of surfactants in the ink, which later often cause problems of adhesion and ink spreading. Instead of a high content of surfactant, the stabilization of an aqueous dispersion of composite resin particles can easily be obtained by using an amphiphilic polymer in the thermally reactive composite resin particle or by using a small amount of polymeric dispersant adhering to the surface of the thermally reactive composite resin particles.

The present invention comprises the inkjet-printer (900) and the use of the inkjet-printer (900), as presented above and presented in various preferred embodiments of the inkjet-printer (900) as presented above, for inkjet printing on a flat substrate (1000), selected from textile, metal, leather, synthetic leather, PVC, glass, wood, ceramics, stone, and concrete; more preferably the inkjet-printer (900} and the use of the inkjet-printer (900), as presented above and presented in various preferred embodiments of the inkjet-printer (900) as presented above, for inkjet printing on a flat substrate (1000) an image, selected from textile, metal, leather, synthetic leather, PVC, glass, wood, ceramics, stone, and concrete by an inkjet-printing-liquid (350) containing thermally reactive composite resin particles in an aqueous medium; and most preferably wherein these thermally reactive composite resin particles contain:

a) at least one thermal cross-linker; and
b) at least one polymeric resin containing functional groups suitable for reacting with the thermal cross-linker; more preferably wherein the at least one thermal cross-linker is a compound functionalized with at least one functional group selected from the group consisting of an epoxide, an oxetane, an aziridine, an azetidine and a blocked isocyanate.

The previous embodiments of the use of the inkjet-printer (900) preferably includes the steps of:

jetting an inkjet-printing-liquid (350), which contains a colorant, to print an image; and applying a heat treatment to the image.

The colorant is preferably a self-dispersible colour pigment. A self-dispersible pigment is a pigment having on its surface covalently bonded anionic or cationic hydrophilic groups, such as salt-forming groups that allow the pigment to be dispersed in an aqueous medium without using a surfactant or a resin.

The inkjet-printer (900) may comprise a plurality of coloured inkjet-printing-liquids, more preferably, a plurality of coloured inkjet-printing-liquids containing thermally reactive composite resin particles. Such a plurality of coloured inkjet-printing-liquids are called an inkjet-printing-liquid-set. The inkjet-printing-liquid-set is preferably an ink set containing at least CMYK or CRYK inks, since colour management software for such ink sets is readily commercially available.

The inkjet-printing-liquid-set may be extended with specific colour inks such as red, green, blue, orange and/or violet inks.

An inkjet-printing-liquid-set may include at least a spot colour ink and a colourless inkjet-printing-liquid (350).

In another preferred embodiment, an inkjet-printing-liquid-set includes at least a spot colour ink and one or more coloured inkjet-printing-liquids. A spot colour ink is well known to a person skilled in the arts of inks. For example, it is advantageously used when substantial surfaces have to be printed with a corporate colour such as Coca-Cola™ red or IBM™ blue. An advantage is, for instance, that it helps to reduce the amount of ink applied since otherwise the spot colour has to be produced by a combination of inks from the ink set.

The inkjet-printing-liquid-set may also include so-called light and dark inks of the same colour. In a preferred embodiment, the inkjet-printing-liquid-set includes a light and a dark magenta ink and/or a light and a dark cyan ink. The use of light and dark inks allows obtaining a better image quality. A dark ink is required for producing intense colours having a high saturation. If only a dark ink containing a high amount of colorant is available for producing pastel colours, then the graininess of the image increases drastically.

The inkjet-printing-liquid-set may also include black and grey inks. In addition to an increased graininess, the use of solely a black ink tends to produce grey colours having a brownish hue.

The inkjet-printing-liquid-set may also include a white inkjet-printing-liquid (350), preferably a white inkjet-printing-liquid (350) including thermally reactive composite resin particles. This allows obtaining more brilliant colours, especially on transparent flat substrates (1000), where the white inkjet-printing-liquid (350) can be applied either as a primer or on top of the colour inkjet-printing-liquids when the image is viewed through a transparent flat substrate (1000).

A colourless inkjet-printing-liquid containing thermally reactive composite resin particles may also be used for improving the gloss on certain flat substrates (1000) like textiles.

A person skilled in the art is very capable of adjusting the viscosity and the surface tension of the inkjet-printing-liquid (350) to fit the requirements of the application technique. The viscosity of an inkjet-printing-liquid (350) used in the invention is preferably smaller than 25 mPa·s at 25° C. and at a shear rate of 90 $s^{-1}$, more preferably between 2 and 15 mPa·s at 25° C. and at a shear rate of 90 $s^{-1}$.

The surface tension of an inkjet-printing-liquid (350) used in the invention is preferably in the range of about 18 mN/m to about 70 mN/m at 25° C., more preferably in the range of about 20 mN/m to about 40 mN/m at 25° C. The inkjet-printing-liquid (350) may also contain at least one surfactant for obtaining good spreading characteristics on a flat substrate (1000).

REFERENCE SIGNS LIST

| | |
|---|---|
| 100 | sticky-layer-cleaner |
| 250 | conveyor belt |
| 350 | inkjet-printing-liquid |
| 400 | receptacle |
| 500 | cleaning-roll |
| 700 | cleaning-liquid |
| 800 | washing-motor |
| 850 | cleaning liquid sucker |
| 900 | inkjet-printer |
| 905 | inkjet-print-head |
| 915 | dryer |
| 1000 | flat substrate |
| 1100 | liquid sprayer |
| 2000 | sticky flat layer |
| 2010 | moving direction |
| 2500 | carpet fabric |

The invention claimed is:

1. An inkjet printer comprising:
a conveyor including a sticky flat layer as a support layer to support a flat substrate during printing; and
a sticky layer cleaner that removes residues adhered to the sticky flat layer, the sticky layer cleaner including:
a receptacle that stores a cleaning liquid; and
a cleaning roll in contact with the sticky flat layer; wherein
the cleaning roll includes an elongated fabric that is helically wound around the cleaning roll and includes a pile including yarn tufts in a loop and/or cut configuration; and
the cleaning roll includes a helical channel along a length of the wound fabric to drain the cleaning liquid from the cleaning roll and/or to wet the cleaning roll with the cleaning liquid.

2. The inkjet printer according to claim 1, wherein the helical channel is defined by opposite lateral edges of the fabric abutted against each other or spaced from each other by a distance less than 50 mm.

3. The inkjet printer according to claim 1, wherein the cleaning roll moves axially during rotation of the cleaning roll.

4. The inkjet printer according to claim 1, wherein the pile is made of polytetrafluoroethylene, polypropylene, polyurethane, polyester, aromatic polyamides, rayon, acrylic, cellulose, viscose, and/or nylon.

5. The inkjet printer according to claim 4, wherein the pile has a height from 0.4 mm to 20 mm.

6. The inkjet printer according to claim 5, wherein the fabric has a fabric density from 1,000 filaments per $cm^2$ to 100,000 filaments per $cm^2$.

7. The inkjet printer according to claim 6, wherein the fabric is selected from the group consisting of antimicrobial carpet fabric, antistatic carpet fabric, and dimensionally stable carpet fabric.

8. The inkjet printer according to claim 7, further comprising a liquid sprayer that sprays the cleaning liquid towards the cleaning roll and/or towards the sticky flat layer.

9. The inkjet printer according to claim 1, further comprising:
an inkjet printing liquid that prints an image on the flat substrate; wherein
the inkjet printing liquid includes thermally reactive composite resin particles in an aqueous medium.

10. The inkjet printer according to claim 9, wherein the thermally reactive composite resin particles include:
at least one thermal cross linker; and
at least one polymeric resin containing functional groups that react with the at least one thermal cross linker; and
the at least one thermal cross linker is a compound functionalized with at least one functional group selected from the group consisting of an epoxide, an oxetane, an aziridine, an azetidine, and a blocked isocyanate.

11. The inkjet printer according to claim 1, wherein the sticky layer includes a water soluble adhesive, a thermoplastic adhesive, a pressure sensitive adhesive, a permanent adhesive, or a fibrillar adhesive system.

12. The inkjet printer according to claim 1, wherein the conveyor includes an endless conveyor belt.

13. A method of using the inkjet printer according to claim 1 to inkjet print on leather.

14. The method according to claim 13, wherein the leather is made from a hide selected from the group consisting of cow, goat, horse, alligator, snake, crocodile, sheep, and calf.

15. A method of using the inkjet printer according to claim 1 to inkjet print on a textile.

* * * * *